United States Patent [19]

Yamamoto et al.

[11] Patent Number: 4,927,611
[45] Date of Patent: May 22, 1990

[54] LIGHTWEIGHT MAGNESIA CLINKER AND PROCESS FOR THE PREPARATION OF THE SAME

[75] Inventors: Kosei Yamamoto; Akira Kaneyasu; Toshiichi Iwamoto, all of Ube, Japan

[73] Assignee: UBE Chemical Industries, LTD., Yamaguchi, Japan

[21] Appl. No.: 207,142

[22] Filed: Jun. 15, 1988

[30] Foreign Application Priority Data

Jun. 15, 1987 [JP] Japan .................. 62-149741

[51] Int. Cl.$^5$ .................. C01F 5/06; C01F 5/08; C01F 5/12
[52] U.S. Cl. .................. 423/155; 423/635; 423/636; 423/637; 423/638; 423/639; 501/108; 501/121
[58] Field of Search .............. 423/635, 636, 637, 638, 423/639; 501/108, 121

[56] References Cited

U.S. PATENT DOCUMENTS

| | | | |
|---|---|---|---|
| 2,804,373 | 8/1957 | Dancy | 423/635 |
| 3,218,130 | 11/1965 | Kawai et al. | 423/639 |
| 3,309,175 | 3/1967 | Berg et al. | 423/635 |
| 3,329,515 | 7/1967 | Leopold | 501/108 |
| 3,352,635 | 11/1967 | Machin et al. | 423/639 |
| 3,711,600 | 1/1973 | Sturm et al. | 423/639 |
| 4,075,311 | 2/1978 | Eustacchio | 423/636 |
| 4,752,459 | 6/1988 | Pepper | 423/636 |

FOREIGN PATENT DOCUMENTS 47-565   11/1972  Japan .................. 501/108
190256   10/1984  Japan .

*Primary Examiner*—John Doll
*Assistant Examiner*—Wayne A. Langel
*Attorney, Agent, or Firm*—Frishauf, Holtz, Goodman & Woodward

[57] ABSTRACT

A lightweight magnesia clinker containing magnesium oxide in an amount of more than 85 wt. % and having an apparent porosity of more than 40 vol. % and a bulk specific gravity of less than 2.0 g/cm$^3$ is disclosed. In the lightweight magnesia clinker, the amount of magnesia clinker particles having a particle diameter of smaller than 3 mm is more than 90 wt. % of the amount of all magnesia clinker particles, and the amount of pores formed in the magnesia clicker particles having a pore size of smaller than 50 μm is more than 90 vol. % of the amount of all pores. A process for the preparation of said lightweight magnesia clinker is also disclosed.

9 Claims, No Drawings

LIGHTWEIGHT MAGNESIA CLINKER AND PROCESS FOR THE PREPARATION OF THE SAME

BACKGROUND OF THE INVENTION

1. Field of the Invention

The present invention relates to a lightweight magnesia clinker and a process for the preparation of the same. More particularly, the present invention relates to a lightweight magnesia clinker which is effectively used as a material for coating a surface of a lining brick employable for a ladle for receiving molten steel or a tundish and as a material of a basic heat-insulating brick in the field of steelmaking industry, and a process for the preparation of the same.

2. Description of Prior Art

In the steelmaking art, a basic fire-resistant material has been heretofore employed as a lining material of a converter or a ladle, and recently the basic fire-resistant material has been also used widely as a coating material of a tundish in a recently employed continuous casting process.

The coating material of a tundish is required to have various properties such as resistance to smelting loss by slag and resistance to permeability of molten steel as well as heat resistance and heat insulation. Further, since a coating material is generally used in a large amount, economically advantageous is a coating material having a larger volume per unit weight, namely, a coating material having a relatively small bulk specific gravity. The conventional coating material is generally made of a hard magnesia clinker. The hard magnesia clinker is prepared through firing at a high temperature and is in the fired state, so that such magnesia clinker has a small apparent porosity and a relatively high bulk specific gravity such as a bulk specific gravity of 3.0 to 3.3. Accordingly, when the hard magnesia clinker is used for preparing a fire-resistant material such as the above-mentioned heat-insulating material and coating material, a variety of measures are practically adopted in the preparation of the fire-resistant material. However, known measures adopted in the process using the hard magnesia clinker hardly give satisfactory fire-resistant materials. Employment of a lightweight magnesia clinker is expected to make it possible to readily provide a lightweight fire-resistant material showing high heat-insulation.

There are known various processes for preparing a magnesia clinker having a high apparent porosity. For example, Japanese Patent Provisional Publication No. 59(1984)-190256 discloses a process for the preparation of a porous magnesia clinker which comprises the steps of mixing a magnesium component and an oil coke, granulating the obtained mixture into desired particles, then calcining the particles to burn out the oil coke so as to form pores within the calcined particles, and further firing the particles at a high temperature.

The porous magnesia clinker obtained in the above-described process is characterized in that the pore size is made larger in order to provide a higher apparent porosity to the resulting magnesia clinker. Accordingly, the magnesia clinker prepared by the process still has drawbacks, although it it improved only in the heat insulation and the bulk specific gravity. For example, when the magnesia clinker is used as a principal ingredient of the above-mentioned coating material, slag or molten steel easily permeates the clinker because of the presence of the large sized pores, whereby the clinker is broken or the molten steel is stained. Moreover, as the pore size is made larger, the resulting magnesia clinker decreases in the mechanical strength.

For those reasons, it is desired to prepare a lightweight magnesia clinker having not only a higher apparent porosity but also smaller sized pores.

SUMMARY OF THE INVENTION

It is an object of the present invention to provide a lightweight magnesia clinker having extremely small sized pores and showing a high apparent porosity and a process for the preparation of said lightweight magnesia clinker.

There is provided by the invention a lightweight magnesia clinker containing magnesium oxide in an amount of more than 85 wt.% and having an apparent porosity of more than 40 vol.% and a bulk specific gravity of less than 2.0 g/cm$^3$, in which the amount of the magnesia clinker particles having a particle diameter of smaller than 3 mm is more than 90 wt.% of the amount of all magnesia clinker particles, and the amount of pores in the magnesia clinker particles having a pore size of smaller than 50 $\mu$m is more than 90 vol.% of the amount of all pores.

The above-mentioned lightweight magnesia clinker can be efficiently prepared by the process of the invention which comprises the steps of mixing a magnesium oxide-forming component having such a particle size distribution that the 100-mesh sieve residue is less than 5 wt.%, a powdery combustible pore-forming material in an amount of 10 to 40 wt.% based on 100 wt.% of the magnesium oxide-forming component and a magnesium salt in an amount of 1 to 15 wt.% based on the total amount of the magnesium oxide-forming component and the powdery combustible pore-forming material to give a mixture, granulating the mixture into particles having an average diameter of smaller than 3 mm, and firing the particles of the mixture at a temperature of 1,300° to 1,600° C.

The lightweight magnesia clinker of the present invention has a high apparent porosity in spite of the fact that the pore formed in the clinker particles has a small size, so that the magnesia clinker is prominently improved in heat insulation and resistance to permeability of molten steel. Accordingly, the magnesia clinker of the invention can be suitably used as a material for coating a surface of a fire-resistant brick, etc. Further, owing to the presence of a great number of extremely small sized closed pores, the bulk specific gravity of the magnesia clinker of the invention is smaller than that of the conventional magnesia clinker having the same apparent porosity, and therefore an economical advantage is given when the magnesia clinker of the invention is used for the above-mentioned purpose.

The process for the preparation of a lightweight magnesia clinker according to the invention is industrially advantageous because the above-described process does not require a two-stage firing comprising calcining and main firing but requires only a one-stage firing at a lower temperature than that used in the conventional process.

DETAILED DESCRIPTION OF THE INVENTION

The lightweight magnesia clinker of the present invention contains magnesium oxide in an amount of more than 85 wt.% preferably 90 wt.%. If the amount of magnesium oxide is less than 85 wt.%, the magnesia clinker is insufficient in both of the mechanical strength and the desired characteristics at high temperatures.

In the present invention, the mechanical strength of the lightweight magnesia clinker is expressed by "a powdering rate" of a magnesia clinker. The powdering rate of the magnesia clinker is determined by charging the magnesia clinker having a particle diameter in the range of 0.5 to 3 mm in a cylinder (i.e., molding die) having a diameter of 50 mm, crushing the charged clinker under the specific load (100 kg/cm$^2$) by means of a compression testing machine (i.e., molding machine), and then sifting the crushed clinker over a 32-mesh sieve. The powdering rate is indicated by the amount (wt.%) of the crushed clinker passing through the 32-mesh sieve.

In the lightweight magnesia clinker of the present invention, the powdering rate determined by the above-described method is preferably less than 50 wt.%. If the powdering rate is more than 50 wt.%, the properties required for the lightweight magnesia clinker may deteriorate when the clinker particles are crushed, or the molten steel may be stained.

The lightweight magnesia clinker of the invention has an apparent porosity of more than 40 vol.%, preferably in the range of 50 to 70 vol.%. If the apparent porosity thereof is less than 40 vol.%, the magnesia clinker shows insufficient heat-insulation and a large bulk specific gravity. If the apparent porosity thereof exceeds 70 vol.%, the mechanical strength tends to lower.

The bulk specific gravity of the magnesia clinker of the invention is required to be less than 2.0 g/cm$^3$, preferably in the range of 1.0 to 1.8 g/cm$^3$. If the bulk specific gravity thereof is more than 2.0 g/cm$^3$, the magnesia clinker is unsuitable as a principal ingredient of the above-mentioned coating material (aggregate for coating) from the economical viewpoint, because the volume per unit weight of the magnesia clinker is too small. If the bulk specific gravity thereof is less than 1.0 g/cm$^3$, the mechanical strength tends to lower. There is a correlation between the bulk specific gravity and the apparent porosity. That is, as the bulk specific gravity increases, the apparent porosity decreases. Accordingly, bulk specific gravity preferably is in the above-stated range.

In the lightweight magnesia clinker of the invention, the amount of magnesia clinker particles having a diameter of smaller than 3 mm is required to be more than 90 wt.% of the amount of all magnesia clinker particles. By setting the particle size distribution in the above-mentioned range, a gas generating by combustion of a pore-forming material readily escapes outside of the clinker particles when the lightweight magnesia clinker is prepared by the process of the invention (which is described hereinafter). As a result, the resulting magnesia clinker has a favorable apparent porosity. Further, the lightweight magnesia clinker having the above-mentioned particle size distribution can be suitably employed as a principal ingredient of the coating material for a tundish lining brick.

In the lightweight magnesia clinker of the invention, the amount of pores formed in the magnesia clinker particles having a pore size (pore diameter) of smaller than 50 μm is required to be more than 90 vol.% of the amount of all pores. If the amount of pores having a pore size of larger than 50 μm exceeds 10 vol.% of the amount of all pores, the clinker particles decrease in the mechanical strength, and slag or molten steel easily permeates the clinker particles through the pores. The pore size distribution can be measured by a porosimeter such as a mercury porosimeter of Model 65 type (produced by ALRO-ERBA Corp.). A method of measuring the pore size distribution by means of a porosimeter is described in detail in "Analytical Chemistry Dictionary" (published by Kyoritsu Shuppan Co., Ltd., Nov. 5, 1971, section "Porosimeter", pp. 1101).

The lightweight magnesia clinker of the present invention can be prepared by the following process.

In the first place, a magnesium oxide-forming component having such a particle size distribution that the 100-mesh sieve residue of the clinker is less than 5 wt.% is prepared. Examples of the magnesium oxide-forming components in the invention include magnesium carbonate, magnesium hydroxide, a natural magnesia clinker powder, a brine magnesia clinker powder, an active magnesia powder and a powder containing those components. If desired, the magnesium oxide-forming component may be ground by an appropriate device such as a ball mill. Preferably used in the invention is a magnesium oxide-forming component having the aforementioned particle size distribution and comprising at least one component selected from the group consisting of a natural magnesia clinker powder, a brine magnesia clinker powder and a dust containing active magnesia which is collected from a rotary kiln used for the preparation of a magnesia clinker.

A mixture of a magnesia clinker powder and an active magnesia is advantageously employed as the magnesium oxide-forming component, because hardening (curing) of the aimed magnesia clinker is accelerated by the firing procedure (described hereinafter) and a yield of the resulting product increases. In the case of using the active magnesia, there is no specific limitation on the amount thereof. The amount of the active magnesia can be optionally determined in consideration of hardening characteristics of the aimed magnesia clinker, the amount of magnesium oxide, etc.

In the second place, to the magnesium oxide-forming component are added a combustible pore-forming material and a magnesium salt, and they are well kneaded to give a mixture.

Examples of the combustible pore-forming materials include oil coke, woodmeal, a cellulose powder, rice bran and corn starch. Preferred is a pore-forming material comprising at least one material selected from the group consisting of oil coke, rice bran and corn starch. In the invention, a mixture of oil coke, rice bran and corn starch is preferably employed, because extremely small sized pores can be readily formed in the clinker particles.

The above-mentioned oil coke is preferably ground by means of a mill to have such a particle size distribution than the 170-mesh sieve residue thereof is less than 2 wt.%. When the 170-mesh sieve residue of the oil coke particles exceeds 2 wt.%, the size of the resulting pore becomes larger than the desired size. It is preferred that each of the particle sizes of the rice bran and the corn starch is substantially smaller than that of the oil coke.

The amount of the combustible pore-forming material is preferably in the range of 10 to 40 parts by weight based on 100 parts by weight of the magnesium oxide-forming component. When the amount of the combustible pore-forming material is less than 10 parts by weight, the apparent porosity and the bulk specific gravity of the resulting clinker are unsatisfactory. When the amount thereof exceeds 40 parts by weight, the resulting clinker tends to lower in the mechanical strength.

Examples of the above-mentioned magnesium salts include magnesium sulfate and magnesium chloride. In the conventional process, a mixture of the magnesium oxide-forming component and the additives is calcined, and then the calcined product is further fired at a high temperature such as a temperature of more than 1,600° C., that is, two-step firing is required. In the invention, however, the mixture can be fired on one stage including no calcining procedure and at a lower temperature than that of the conventional process owing to the employment of a magnesium salt. Further, the magnesium salt serves to bond particles of the magnesium oxide-forming component to each other, so that extremely small sized pores can be formed by the function of the magnesium salt in addition to the formation of pores by the combustible pore-forming material. Further, the mechanical strength can be maintained owing to the presence of a magnesium salt. The pore formed by the function of the magnesium salt is liable to be a closed pore having no opening on the surface of the magnesia clinker particle, which is different from the pore formed by the single use of a combustible pore-forming material. For this reason, the bulk specific gravity of the lightweight magnesia clinker of the invention is smaller than that of the conventional magnesia clinker, even if the apparent porosity thereof is almost the same as that of the conventional one. That is, the volume per unit weight increases, and therefore the magnesia clinker of the invention is economically advantageous.

The amount of the magnesium salt employed in the invention generally is in the range of 1 to 15 wt.%, preferably in the range of 5 to 10 wt.%, of the total weight of the magnesium oxide-forming component and the combustible pore-forming material. The magnesium salt may be used in the form of a solution, and in this case an aqueous content of the mixture can be simultaneously controlled.

Subsequently, the mixture of magnesium oxide-forming component, combustible pore-forming material and magnesium salt (also referred to hereinafter as a mixture of starting materials) obtained as above is sufficiently kneaded. In the kneading procedure, water may be added to control an aqueous content in the mixture of starting materials. The water is generally added to the mixture in such an amount that the mixture has a viscosity so that the mixture can be granulated. Generally, the amount of water is in the range of 10 to 25 wt.% of the mixture of starting materials. The mixture of starting materials is then granulated into particles having an average diameter of smaller than 3 mm using a granulator. For granulating the mixture of starting materials, there can be employed various methods such as extrusion granulating method, rolling granulating method and fluid bed granulating method. It is desired to granulate the mixture using both of the extrusion granulating method and the rolling granulating method.

The particles obtained by granulation of the mixture of starting materials are subjected to a firing procedure. If desired, the particles of the mixture may be subjected to a drying procedure prior to the firing procedure. Drying of the particles may be done by heating them at a temperature of 100° to 140° C. or applying an air thereto using an appropriate drying device such as an air bath and a flow drying machine.

In the case of using an active magnesia powder or a dust collected from a rotary kiln used for the preparation of a magnesia clinker as a magnesium oxide-forming component, the active magnesia powder or the dust generates heat and is cured by simply mixing a combustible pore-forming material and water therewith, because each of those magnesium oxide-forming components contains a sulfate component. That is, when the above-mentioned active magnesia powder or dust is used as the magnesium oxide-forming component, the same effect as that given by adding a magnesium salt is brought about. Accordingly, the above-mentioned active magnesia powder or dust is advantageously used as the magnesium oxide-forming component.

The firing procedure can be done by heating at a temperature of 1,300° to 1,600° C. using an appropriate heating device such as an oxygen-propane furnace, an electric furnace and a rotary kiln. Through the firing, extremely small sized pores are formed and a bonding between periclase crystals is developed. Thus, a lightweight magnesia clinker of the present invention can be obtained.

The lightweight magnesia clinker of the invention is very suitable as a coating material for coating a surface of a tundish lining brick, etc., which are used in the steelmaking process. In the practical use, for example, the lightweight magnesia clinker of the invention is mixed with a binder and a water to give a mixture, and the mixture is sprayed over the lining brick by means of a nozzle or the like.

The examples of the present invention are given below.

EXAMPLES 1-4

A natural magnesia clinker (magnesium oxide-forming component, MgO: 87.01 wt.%, CaO: 3.31 wt.%, $SiO_2$: 4.33 wt.%, $Fe_2O_3$: 1.18 wt.%, $Al_2O_3$: 1.79 wt.%, $B_2O_3$: 0.04 wt.%) was ground in such a manner that a 100-mesh sieve residue of the clinker would be less than 5 wt.%. To 1,000 g. of the obtained natural magnesia clinker powder were successively added 400 g. of an oil coke powder (combustible pore-forming material) having a 170-mesh sieve residue of less than 2 wt.% and 786.5 g. of an aqueous magnesium sulfate solution containing 17.8 wt.% of magnesium sulfate, and they were well mixed to give a mixture. The mixture was granulated by means of a PV-5 type granulator (screen diameter: 2 mm, produced by Fuji Powder Co., Ltd.) in such a manner that the amount of granulated particles having a diameter of smaller than 3 mm would be less than 90 wt.% of the amount of all particles.

Subsequently, the particles of the mixture were dried at 100° C. for 24 hrs. in an air bath, and divided into four portions. These portions were then fired at 1,300° C., 1,400° C., 1,500° C. and 1,600° C., respectively, in an oxygen-propane furnace, to prepare a variety of lightweight magnesia clinkers. There was no variation on the particle size distribution of each lightweight magnesia clinker between the stage of after the firing and the stage of immediately after the granulation.

The obtained lightweight magnesia clinkers were examined on residual carbon through eye observation and by means of Yanagimoto CHN Corder of MT-3 type (trade name, produced by Yanagimoto Co., Ltd.). It was confirmed that the combustible pore-forming material burned out and no carbon remained in each of the obtained magnesia clinkers.

The physical properties of the lightweight magnesia clinker obtained by firing at each of the above-mentioned temperatures are set forth in Table 1.

EXAMPLE 5

The procedures of Example 1 were repeated except for using a mixture of 200 g. of an oil coke powder and 200 g. of rice bran as a combustible pore-forming material instead of 400 g. of the oil coke powder and using a firing temperature of only 1,400° C., to prepare a lightweight magnesia clinker.

The physical properties of the obtained lightweight magnesia clinker are set forth in Table 1.

EXAMPLE 6

The procedure of Example 1 were repeated except for using 400 g. of rice bran (the same as used in Example 5) as a combustible pore-forming material instead of 400 g. of the oil coke powder and using a firing temperature of only 1,400° C., to prepare a lightweight magnesia clinker.

The physical properties of the obtained lightweight magnesia clinker are set forth in Table 1.

EXAMPLES 7-9

The procedures of Example 1 were repeated except for using a mixture of 700 g. of a natural magnesia clinker powder (the same as used in Example 1) and 300 g. of a Cottrell's dust (100-mesh sieve residue: less than 5 wt.%, containing 30-60 wt.% of an active magnesia) having been collected from a rotary kiln used for the preparation of a magnesia clinker as a magnesium oxide-forming component instead of 1.000 g. of the natural magnesia clinker, using each of the same materials as those used in Examples 1, 5 and 6, respectively, as a combustible pore-forming material, and using a firing temperature of only 1,400° C., to prepare a variety of lightweight magnesia clinkers.

The physical properties of the obtained lightweight magnesia clinkers are set forth in Table 1.

EXAMPLES 10-12

The procedures of Example 7 were repeated except for using 1.000 g. of Cottrell's dust (the same as used in Example 7) as a magnesium oxide-forming component instead of the mixture of 700 g. of a natural magnesia clinker powder and 300 g. of Cottrell's dust and carrying out a firing procedure without drying the particles of the mixture, to prepare a variety of lightweight magnesia clinkers.

The physical properties of the obtained lightweight magnesia clinkers are set forth in Table 1.

TABLE 1

| | MgO Forming Component | | Pore-forming Material | | Mg Salt | Firing |
|---|---|---|---|---|---|---|
| | A (g.) | B (g.) | C (g.) | D (g.) | MgSO$_4$ (g.) | Temp. (°C.) |
| Ex. 1 | 1,000 | none | 400 | none | 140 | 1,300 |
| Ex. 2 | 1,000 | none | 400 | none | 140 | 1,400 |
| Ex. 3 | 1,000 | none | 400 | none | 140 | 1,500 |
| Ex. 4 | 1,000 | none | 400 | none | 140 | 1,600 |
| Ex. 5 | 1,000 | none | 200 | 200 | 140 | 1,400 |
| Ex. 6 | 1,000 | none | none | 400 | 140 | 1,400 |
| Ex. 7 | 700 | 300 | 400 | none | 140 | 1,400 |
| Ex. 8 | 700 | 300 | 200 | 200 | 140 | 1,400 |
| Ex. 9 | 700 | 300 | none | 400 | 140 | 1,400 |
| Ex. 10 | none | 1,000 | 400 | none | 140 | 1,400 |
| Ex. 11 | none | 1,000 | 200 | 200 | 140 | 1,400 |
| Ex. 12 | none | 1,000 | none | 400 | 140 | 1,400 |

TABLE 1-continued

| | Physical Properties of Magnesia Clinker | | | | |
|---|---|---|---|---|---|
| | Amount of MgO (wt. %) | Apparent Porosity (vol. %) | Bulk Specific Gravity (g/cm$^3$) | Pore Size Distribution (vol. %) | Powdering Rate (wt. %) |
| Ex. 1 | 87.0 | 58.1 | 1.43 | 93 | 49.5 |
| Ex. 2 | 87.2 | 54.2 | 1.56 | 95 | 40.3 |
| Ex. 3 | 87.5 | 50.7 | 1.75 | 98 | 38.5 |
| Ex. 4 | 87.8 | 46.3 | 1.87 | 100 | 35.2 |
| Ex. 5 | 87.2 | 59.4 | 1.42 | 96 | 41.5 |
| Ex. 6 | 87.4 | 62.1 | 1.31 | 99 | 43.8 |
| Ex. 7 | 90.3 | 52.1 | 1.61 | 95 | 34.1 |
| Ex. 8 | 91.7 | 58.1 | 1.48 | 97 | 36.2 |
| Ex. 9 | 92.1 | 59.4 | 1.37 | 99 | 36.3 |
| Ex. 10 | 95.6 | 46.4 | 1.87 | 97 | 32.5 |
| Ex. 11 | 95.9 | 49.3 | 1.64 | 98 | 31.5 |
| Ex. 12 | 97.3 | 54.2 | 1.53 | 99 | 31.4 |

Note:
Symbols of A, B, C and D in Table 1 indicate the following materials, respectively:
A: natural magnesia clinker powder;
B: Cottrell's dust;
C: oil coke powder; and
D: rice bran.

In each of Examples 10 to 12, a drying procedure was not carried out.

The pore size distribution means a ratio of the amount of pores in the obtained magnesia clinker particles having a pore size of smaller than 50 μm to the amount of whole pores, and is expressed by "vol.%".

The amount of MgSO$_4$ is indicated by a value based on the dry state.

EXAMPLE 13

To a mixture (magnesium oxide-forming component) of 70 parts by weight of a natural magnesia clinker powder (the same as used in Example 1) and 30 parts by weight of Cottrell's dust (the same as used in Example 7) were added 20 parts by weight of an oil coke powder (the same as used in Example 1) and 20 parts by weight of rice bran (the same as used in Example 5) as a combustible pore-forming material.

To the obtained mixture was added an aqueous magnesium sulfate solution containing 17.8 wt.% of magnesium sulfate in an amount of 20 wt.% of the mixture, and they were sufficiently kneaded. The kneaded mixture was then granulated by means of a PV-5 type granulator (screen diameter: 2 mm, produced by Fuji Powder Co., Ltd.) to give particles of the mixture having an average diameter of smaller than 3 mm.

The obtained particles were air-dried and then fired at a temperature of 1,400° C. in a rotary kiln. Thus, a lightweight magnesia clinker was obtained.

The physical properties of the obtained lightweight magnesia clinker are set forth in Table 2.

EXAMPLE 14

The procedure of Example 13 were repeated except for using 100 parts by weight of Cottrell's dust (the same as used in Example 13) as a magnesium oxide-forming component instead of the mixture of 70 parts by weight of a natural magnesia clinker powder and 30 parts by weight of Cottrell's dust and carrying out a firing procedure without drying the particles of the mixture, to prepare a lightweight magnesia clinker.

The physical properties of the obtained lightweight magnesia clinker are set forth in Table 2.

TABLE 2

| Properties of Magnesia Clinker | Example 13 | Example 14 |
| --- | --- | --- |
| Amount of MgO (wt. %) | 91.4 | 97.1 |
| Apparent porosity (vol. %) | 58.3 | 55.3 |
| Bulk specific gravity (g/cm$^3$) | 1.46 | 1.58 |
| Particle size distribution (wt. %) | 96.9 | 96.2 |
| Pore size distribution (vol. %) | 95 | 98 |
| Powdering rate (wt. %) | 43.1 | 30.1 |

Note: The particle size distribution means a ratio of the amount of particles of the obtained magnesia clinker having a particle diameter of smaller than 3 mm to the amount of whole particles, and is expressed by "wt. %".

We claim:

1. A process for the preparation of a lightweight magnesia clinker which comprises the steps of granulating a mixture of a magnesium oxide-forming component having a particle size distribution such that the 100-mesh sieve residue is less than 5 wt.%, a powder combustible pore-forming material in an amount of 10 to 40 parts by weight based on 100 parts by weight of the magnesium oxide-forming component and a magnesium salt in an amount of 1 to 15 wt.% of the total weight of the magnesium oxide-forming component and the powder combustible pore-forming material to form particles having an average diameter of smaller than 3 mm, and firing the particulate mixture at a temperature of 1,300° to 1,600° C.

2. The process as claimed in claim 1, wherein said magnesium oxide-forming component is selected from the group consisting of magnesium carbonate, magnesium hydroxide, a natural magnesia clinker powder, a brine magnesia clinker powder and a dust containing an active magnesia which is gathered from a rotary kiln during the preparation of a magnesia clinker.

3. The process as claimed in claim 1, wherein said combustible pore-forming material is selected from the group consisting of oil coke, rice bran and corn starch.

4. The process as claimed in claim 1, wherein said magnesium salt is magnesium sulfate or magnesium chloride.

5. The process as claimed in claim 1, wherein said magnesium salt is in an amount of 5 to 10 wt.%.

6. The process as claimed in claim 1, wherein the mixture which is granulated contains 10 to 25 wt.% of water.

7. The process as claimed in claim 2, wherein said combustible pore-forming material is selected from the group consisting of oil coke, rice bran and corn starch; and wherein said magnesium salt is magnesium sulfate or magnesium chloride.

8. The process as claimed in claim 7, wherein said magnesium salt is in an amount of 5 to 10 wt.%.

9. The process as claimed in claim 8, wherein a mixture which is granulated contains 10 to 25 wt.% of water.

* * * * *